United States Patent
Stotz et al.

(10) Patent No.: US 12,180,854 B2
(45) Date of Patent: Dec. 31, 2024

(54) GAS SUPPLY APPARATUS

(71) Applicant: Robert Bosch GmbH, Stuttgart (DE)

(72) Inventors: Ingo Stotz, Ditzingen (DE); Yannick Fabian Frey, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/557,632

(22) PCT Filed: Apr. 8, 2022

(86) PCT No.: PCT/EP2022/059377
§ 371 (c)(1),
(2) Date: Oct. 27, 2023

(87) PCT Pub. No.: WO2022/228860
PCT Pub. Date: Nov. 3, 2022

(65) Prior Publication Data
US 2024/0218808 A1    Jul. 4, 2024

(30) Foreign Application Priority Data
Apr. 28, 2021 (DE) ............... 10 2021 204 229.5

(51) Int. Cl.
*F01D 25/12* (2006.01)

(52) U.S. Cl.
CPC ........ *F01D 25/125* (2013.01); *F05D 2240/54* (2013.01)

(58) Field of Classification Search
CPC .................... F01D 25/125; F05D 2240/54
See application file for complete search history.

(56) References Cited

U.S. PATENT DOCUMENTS

| | | | | |
|---|---|---|---|---|
| 8,395,288 B2* | 3/2013 | Huynh | .................... | H02K 9/06 |
| | | | | 310/59 |
| 9,394,941 B2* | 7/2016 | Ryu | .................... | F16C 32/0603 |
| 11,177,489 B2* | 11/2021 | Sakota | .................... | H02K 9/06 |
| 11,248,612 B2* | 2/2022 | Sakota | .................... | F04D 29/057 |
| 11,339,800 B2* | 5/2022 | Sakota | .................... | F01D 17/141 |
| 11,852,153 B1* | 12/2023 | O'Meara | .................... | F04D 29/056 |

(Continued)

FOREIGN PATENT DOCUMENTS

| DE | 102012224052 A1 | 6/2014 |
|---|---|---|
| DE | 102017212815 A1 | 1/2019 |

(Continued)

OTHER PUBLICATIONS

Translation of International Search Report for Application No. PCT/EP2022/059377 dated Jun. 27, 2023 (2 pages).

*Primary Examiner* — Jesse S Bogue
(74) *Attorney, Agent, or Firm* — Michael Best & Friedrich LLP

(57) ABSTRACT

The invention relates to a gas supply apparatus (21) having a shaft (23) which is rotatably mounted in a housing (22) using a gas bearing assembly (18) that is temperature-controlled with dispensing gas, and comprising a gas temperature-control device.
In order to improve the gas supply apparatus (21) in respect of its manufacturing process and/or its functions, the gas temperature-control device is combined with a liquid temperature-control device (40) in an annular space (33) of the gas supply apparatus (21).

9 Claims, 4 Drawing Sheets

(56) References Cited

U.S. PATENT DOCUMENTS

| | | | | |
|---|---|---|---|---|
| 2009/0056681 A1* | 3/2009 | Shibui | ............ | F02B 37/04 |
| | | | | 123/559.1 |
| 2011/0097222 A1* | 4/2011 | Komatsu | ............ | F04D 29/5853 |
| | | | | 417/366 |
| 2015/0008771 A1* | 1/2015 | Lee | ............ | F04D 29/053 |
| | | | | 310/62 |

FOREIGN PATENT DOCUMENTS

| | | |
|---|---|---|
| DE | 102018218820 A1 | 5/2020 |
| DE | 112018005198 T5 | 6/2020 |
| EP | 2102507 B1 | 8/2010 |

\* cited by examiner
GAS SUPPLY APPARATUS

BACKGROUND

The invention relates to a gas supply apparatus having a shaft which is rotatably mounted in a housing using a gas bearing assembly that is temperature-controlled with a dispensing gas, and comprising a gas temperature-control device.

From the German disclosure DE 10 2017 212 815 A1, a turbo machine designed as a turbo compressor for a fuel cell system having a shaft, an impeller, and having an axial bearing washer is known, wherein the impeller and the axial bearing washer are arranged on the shaft, wherein a running surface for the axial bearing is configured on the axial bearing washer, wherein the running surface forms an axial bearing with a corresponding bearing surface, wherein a flow device is arranged on the axial bearing washer, wherein the flow device is in a cooling fluid path, wherein the same medium is preferably used as the cooling fluid, which flows through the impeller as working fluid.

SUMMARY

The object of the invention is to improve a gas supply apparatus having a shaft which is rotatably mounted in a housing using a gas bearing assembly that is temperature-controlled with dispensing gas, and comprising a gas temperature-control device, in respect of its manufacturing process and/or its functions.

The object is solved in a gas supply apparatus having a shaft which is rotatably mounted in a housing using a gas bearing assembly that is temperature-controlled with dispensing gas, and comprising a gas temperature-control device, in that the gas temperature-control device is combined with a liquid temperature-control device in an annular space of the gas supply apparatus. The gas supply apparatus is preferably an electrically driven turbo compressor with which air supplied to a fuel cell is compressed. From the compressed air, the so-called dispensing air is branched off, which is used in particular for cooling gas bearings. Using the liquid temperature-control device, the dispensing air is advantageously cooled first. This is preferably done with a dispensing gas cooler or a dispensing air cooler integrated into the gas supply apparatus. Decisive parameters for such a dispensing gas cooler or dispensing air cooler are a high conductivity of the cooler material to realize a fast heat transport, a large cooler surface to realize a compact design, as well as a good connection to a liquid jacket or water jacket of the gas supply apparatus. The gas temperature-controlled by the gas temperature-control device, in particular the dispensing air cooled by the dispensing air cooler, may advantageously be used additionally for temperature control, in particular for cooling, of a rotor of an electric machine used to drive the gas supply apparatus.

A preferred embodiment of the gas supply apparatus is characterized in that the gas temperature-control device has a gas guiding geometry comprising gas guiding bodies, such as ribs, lamellae, or fins. Using finned gas guiding geometries, in particular cooler geometries, can effectively improve heat transfer. In addition, the gas guiding geometry allows for a compact design of the gas temperature-control device, in particular of the cooler. Thus, the temperature-control power density, in particular the cooling power density, can be improved.

A further preferred embodiment of the gas supply apparatus is characterized in that the gas temperature-control device comprises a round-bent sheet metal component having the gas guiding geometry. On the one hand, known gas guiding geometries can be used, such as so-called offset strip fin structures or lanced offset fin structures. These structures can also be referred to as strip fins. By round bending the sheet metal components, the manufacture of the gas temperature-control device is significantly simplified. The sheet metal component with the gas guiding geometry can be simply and cost-efficiently made from a sheet metal material, in particular from an aluminum sheet metal material, for example by punching and forming. The surface of the gas guiding geometry that is effective during temperature-control can be advantageously increased by means of suitable gas guiding bodies, such as ribs, lamellae, or fins, such that a compact gas temperature-control device can be manufactured by simple means. The sheet metal component can advantageously also be equipped with lamellae. The desired heat transfer can be further intensified by means of a suitable flow direction within the gas guiding geometry.

A further preferred embodiment of the gas supply apparatus is characterized in that the gas guiding geometry comprises an axial web separating a gas supply side of the gas guiding geometry from a gas discharge side of the gas guiding geometry. The gas is advantageously deflected several times between the gas supply side and the gas discharge side using the gas guiding geometry. The heat transfer, in particular the cooling of the gas, can thus be further intensified.

A further preferred embodiment of the gas supply apparatus is characterized in that the gas temperature-control device comprises a sleeve-like base body. The sleeve-like base body is a type of tubular body, for example, which essentially has the shape of a straight circle cylinder jacket. The sleeve-like base body is formed from, for example, a round-bent aluminum sheet metal. This further simplifies the manufacture of the gas temperature-control device.

A further preferred embodiment of the gas supply apparatus is characterized in that the round-bent sheet metal component is connected to the sleeve-like base body in a material-locking fashion. For example, the round-bent sheet metal component is soldered to the sleeve-like base body. This further simplifies the manufacture of the gas temperature-control device.

A further preferred embodiment of the gas supply apparatus is characterized in that the sleeve-like base body comprises an axial web that separates a gas supply side of the gas guiding geometry from a gas discharge side of the gas guiding geometry. This further simplifies the manufacture of the gas temperature-control device. The sleeve-like base body with the axial web is advantageously manufactured independently of the sheet metal component with the gas guiding geometry. For example, a conventional planar sheet metal component can be used to represent the gas guiding geometry, such as is used for so-called pin-fin coolers. The planar sheet metal component is bent round until it assumes an approximately rotationally symmetric geometry. The round-bent sheet metal component is then soldered to the separately manufactured base body.

A further preferred embodiment of the gas supply apparatus is characterized in that the liquid temperature-control device is arranged on an inner diameter of the base body. The liquid temperature-control device advantageously comprises a water jacket that abuts the interior of the base body.

A further preferred embodiment of the gas supply apparatus is characterized in that the liquid temperature-control device is arranged on an outer diameter of the gas temperature-control device. The liquid temperature-control device advantageously comprises a water jacket abutting the outer diameter of the gas temperature-control device. According to a further exemplary embodiment, the liquid temperature-control device comprises two water jackets, between which the base body is arranged with the gas temperature-control device. This optimizes the temperature control, in particular the cooling, of the gas in the gas temperature-control device.

A further preferred embodiment of the gas supply apparatus is characterized in that the gas guiding geometry comprises flow channels in which the dispensing gas is deflected between the gas supply side and the gas discharge side. Between the gas supply side and the gas discharge side, the dispensing gas is preferably deflected by approximately three hundred and sixty degrees. The gas guiding geometry may comprise closed flow channels. However, the gas guiding geometry may also comprise open flow channels in which the gas to be temperature-controlled is guided through in a meandering manner.

A further preferred embodiment of the gas supply apparatus is characterized in that the gas guiding geometry is combined with a simple sealing device, such as an O-ring, which is arranged for sealing between the base body or the gas guiding geometry and the liquid temperature-control device. This further simplifies the manufacture of the gas temperature-control device.

The invention further relates to a gas temperature-control device, in particular a gas guiding geometry, in particular a sheet metal component, and/or a single part for a gas supply apparatus described previously. The mentioned parts can be procured separately.

The invention further relates to a method for manufacturing a gas temperature-control device described previously.

Further advantages, features, and details of the invention arise from the following description, in which various embodiment examples are described in detail with reference to the drawing.

DETAILED DESCRIPTION

Figure 1:
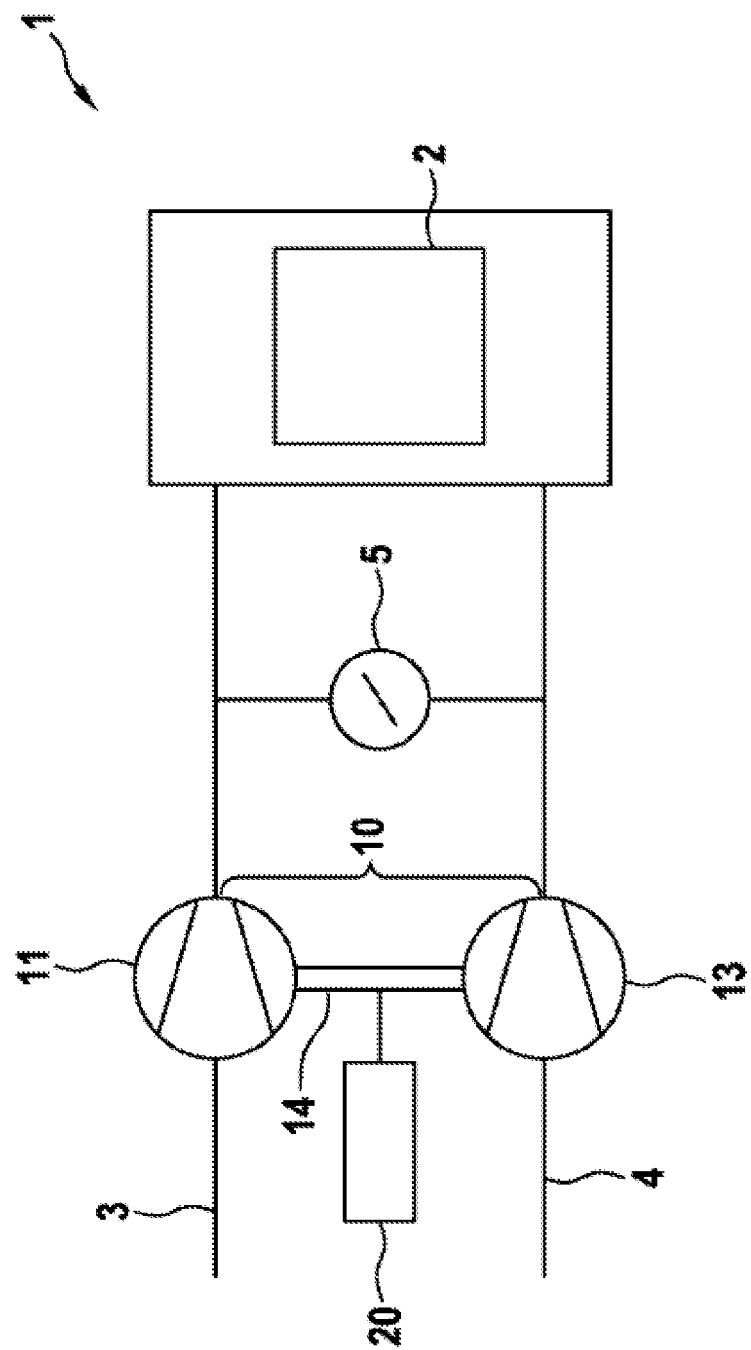
FIG. 1 a schematic illustration of a fuel cell system having a turbo machine designed as a turbo compressor from the prior art.

FIG. 1 shows a fuel cell system 1 known from DE 10 2012 224 052 A1. The fuel cell system 1 comprises a fuel cell, an air supply line 3, an exhaust gas line 4, a compressor 11, an exhaust gas turbine 13, a bypass valve 5 for pressure reduction, and a fuel supply line to the fuel cell 2 which is not shown in more detail. The bypass valve 5 may be a control valve, for example. For example, a wastegate valve may be employed as the bypass valve 5.

The fuel cell 2 is a galvanic cell that converts chemical reaction energy of a fuel supplied via the fuel supply line not shown and an oxidizing agent into electrical energy, which in the embodiment shown here, is intake air supplied to the fuel cell 2 via the air supply line 3. The fuel may preferably be hydrogen or methane or methanol. Accordingly, water vapor, or water vapor and carbon dioxide, are produced as exhaust gases. For example, the fuel cell 2 is configured to drive a drive device of a motor vehicle. For example, the electrical energy generated by the fuel cell 2 drives an electric motor of the motor vehicle 1.

The compressor 11 is arranged in the air supply line 3. The exhaust gas turbine 13 is arranged in the exhaust gas line 4. The compressor 11 and the exhaust gas turbine 13 are mechanically connected via a shaft 14. The shaft 14 can be electrically driven by a drive device 20. The exhaust gas turbine 13 is used to support the drive device 20 to drive the shaft 14 or the compressor 11. The compressor 11, shaft 14, and exhaust gas turbine 13 together form a turbo machine 10.

Figure 2:
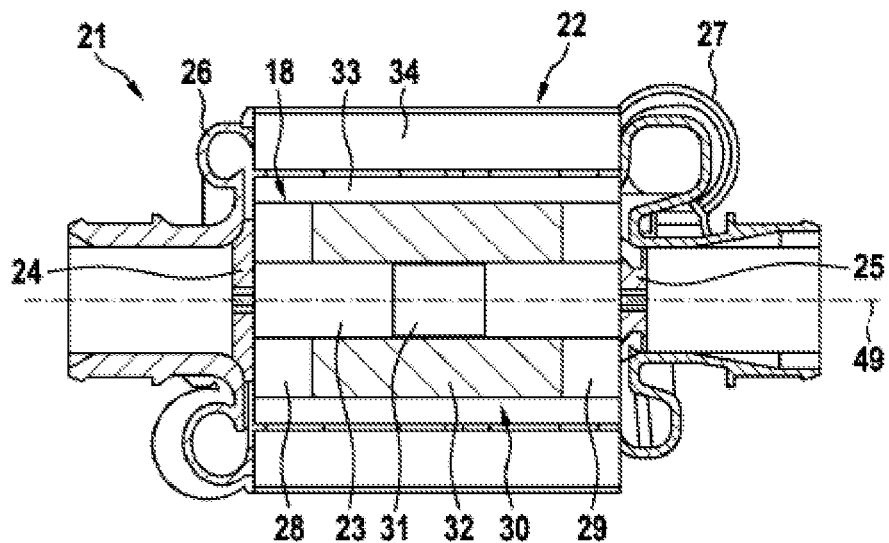
FIG. 2 a gas supply apparatus with an annular space for receiving a gas temperature-control device combined in the annular space with a liquid temperature-control device in the longitudinal section.

In FIG. 2, a gas supply apparatus 21 is shown schematically in a longitudinal section. The gas supply apparatus 21 is an electrically driven turbo compressor for air compression in a fuel cell system as shown in FIG. 1. The gas supply apparatus 21 is also referred to as a compressor 21 for short.

The compressor 21 comprises a housing 22 in which a shaft 23 is rotatably mounted using a gas bearing assembly 18 about an axis of rotation 49. An impeller 24 is attached to one end of the shaft 23 on the left in FIG. 2. An impeller 25 is attached to one end of the shaft 23 on the right in FIG. 2.

The impellers 24, 25 are each rotatable within a volute 26, 27. For example, the impeller 24 having the volute 26 serves to represent a compressor function. For example, the impeller 25 having the volute 27 serves to represent a turbine function.

The gas bearing assembly 18 comprises two gas bearings 28, 29. The gas bearings 28, 29 are embodied as radial bearings, for example. Additionally, the gas bearing assembly 18 still comprises at least one axial bearing not shown in FIG. 2.

The shaft 23 is driven by a drive device 30. For example, the drive device 30 is embodied as an electric motor having a rotor 31 and a stator 32. For example, the rotor 31 is integrated into the shaft 23. The stator 32 is arranged in the housing 22. The housing 22 comprises two annular spaces 33, 34.

The annular spaces 33, 34 are shown by way of example only. For example, the annular spaces 33, 34 serve to receive at least one gas temperature-control device combined in the housing 22 with at least one liquid temperature-control device.

The gas temperature-control device is used for temperature control, in particular to cool gas, in particular air, which is compressed during operation of the gas supply apparatus 21. The gas that is compressed with the compressor is preferably air.

A portion of the compressed air is not supplied to the fuel cell but is branched off and used for temperature-control, in particular for cooling, in the gas supply apparatus 21. The branched or tapped air is also referred to as dispensing air.

The dispensing air or the dispensing gas is cooled in the gas supply apparatus 21 with the gas temperature-control device. Thus, the gas temperature-control device is also referred to as an air cooler. The cooled gas, in particular the cooled air, is supplied to the gas bearings 28, 29, in particular the air bearings.

To cool the gas, in particular the air, the gas temperature-control device in the annular space 33 is combined with the liquid temperature-control device, which is embodied as a water cooler, for example. The liquid temperature-control device advantageously comprises a liquid jacket, in particular a water jacket, in the annular space 33.

Figure 3:
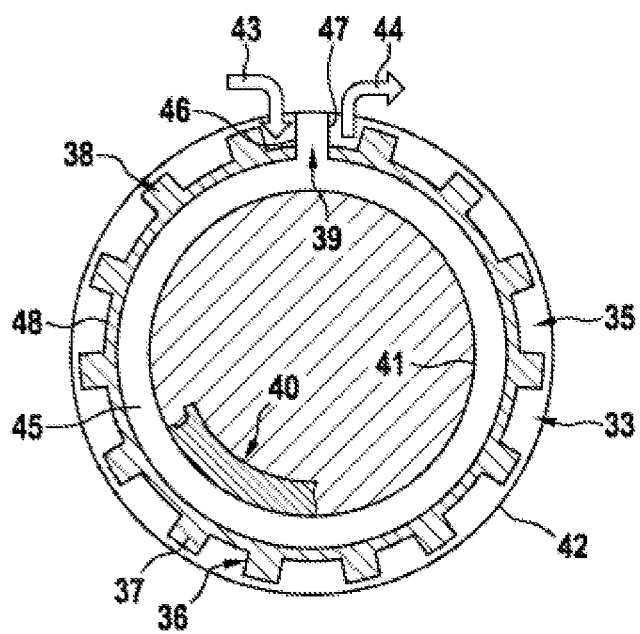
FIG. 3 the annular space of FIG. 2 alone in cross section.

FIG. 3 shows the annular space 33 alone. In the annular space 33, a gas temperature-control device 35 is combined with a liquid temperature-control device 40. The gas temperature-control device 35 comprises a gas guiding geometry 36 along which the gas to be temperature-controlled, in particular the gas to be cooled, is guided and preferably deflected.

The gas guiding geometry 36 comprises gas guiding bodies 37, which are embodied as ribs, lamellae, or fins, for example. The surface area at which the gas to be temperature controlled is guided is increased by the gas guiding geometry 36. This intensifies the heat transfer between the gas and the gas guiding body 37.

Figure 5:
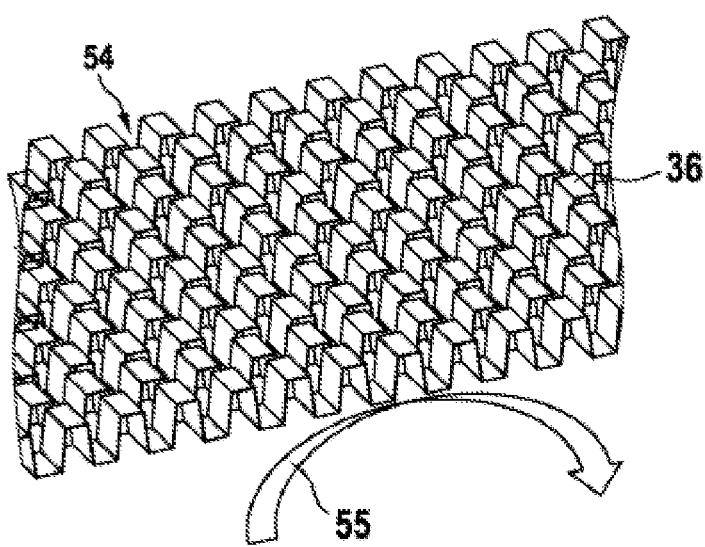
Figure 6:
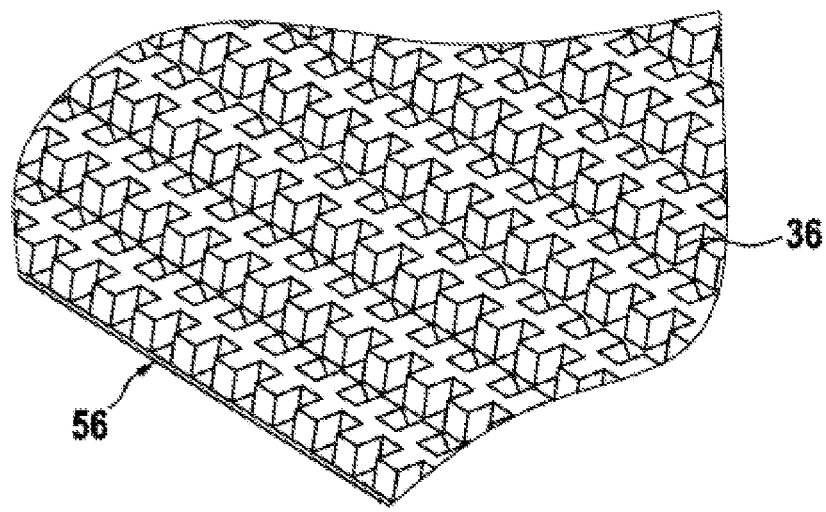
Figure 7:
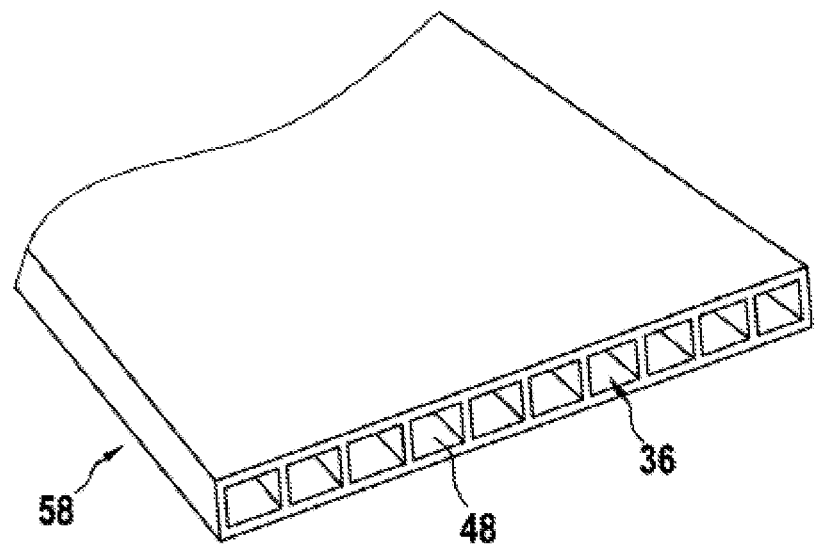

The gas guiding geometry 36 is particularly advantageous for a round-bent sheet metal component 38. This provides the advantage, among other things, that known gas guiding geometries can be used to realize the gas temperature-control device 35 for the gas supply apparatus 21. FIGS. 5 to 7 show a perspective view of the sheet metal component 54; 56; 58 with suitable gas guiding geometries.

The sheet metal components 54; 56; 68 are planar structures that are bent round to represent the gas temperature-control device 35, as indicated in FIG. 5 by an arrow 55. Thus, the sheet metal components 54; 56; 58 are brought into an approximately rotationally symmetric configuration.

The round-bent sheet components are, for example, inserted into the annular space 33 or clamped, soldered, welded, or otherwise joined in the annular space 33. The round-bent sheet metal component is advantageously brought into contact with the liquid temperature-control device 40. This contact can be made on one side, i.e., radially inward or radially outward, or both sides, i.e., radially inward and radially outward, to represent a desired heat transfer.

In FIG. 3, an arrow 43 indicates gas that enters the gas temperature-control device 35 with the gas guiding geometry 36 on a gas supply side 46 of an axial web 39. In the gas temperature-control device 35, the gas is deflected several times at the gas guiding geometry 36 by the gas guiding bodies 37.

In the gas temperature-control device 35, the gas in contact with the gas guiding geometry 36 is temperature-controlled, in particular cooled. An arrow 44 in FIG. 3 indicates how the temperature-controlled, in particular cooled, gas exits the gas temperature-control device 35 having the gas guiding geometry 36 at a gas discharge side 47 of the axial web 39.

Figure 4:
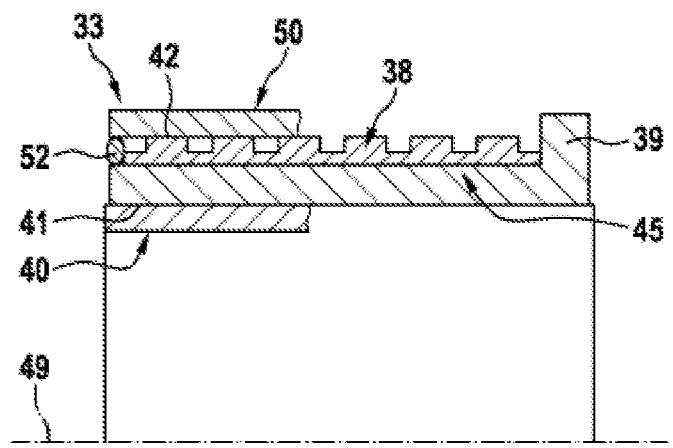
FIG. 4 the annular space of FIG. 3 alone in the longitudinal section; and the FIGS. 5 to 7 three exemplary embodiments of a gas guiding geometry for representing the gas temperature-control device.

The axial web 39 may be formed on the gas guiding geometry 36 itself. In FIG. 3, the axial web 39 is configured on a sleeve-like base body 45. The sleeve-like base body 45 has the shape of a collar sleeve, as can be seen by looking at FIGS. 3 and 4. Unlike as shown in FIG. 4, the axial web may also extend throughout the axial dimension of the base body 45.

The annular space 33 has an inner diameter 41. The inner diameter 41 of the annular space 33 coincides with an inner diameter of the base body 45, as can be seen in FIGS. 3 and 4. A liquid temperature-control device 40, which comprises, for example, a water jacket, is located on the inner diameter 41.

A liquid cooling medium, such as water, flows through the water jacket. Thus, heat released from the gas 43, 44 via the gas guiding geometry 36 to the base body 45 is removed via the liquid cooling medium in the liquid temperature-control device 40.

The annular space 33 has an outer diameter 42. In FIG. 4, it can be seen that a further liquid temperature-control device 50 abuts the outer diameter 42. This ensures that the gas in the gas temperature-control device 35 is in contact with the liquid temperature-control device 50.

A gas reception space between the gas guiding geometry 36 and the liquid temperature-control device 50, which is configured as a water jacket, for example, is sealed in a simple manner by a seal 52, which is configured as an O-ring, for example.

The base body 45 can also only consist of a round-bent aluminum sheet metal soldered to the sheet metal component 38. The liquid temperature-control device 40; 50 may also comprise a sheet metal component 58, as shown in FIG. 7. The sheet metal component 50 includes flow channels 48 through which a liquid medium, such as cooling water, flows.

The invention claimed is:

1. A gas supply apparatus (21) having a shaft (23) rotatably mounted in a housing (22) using a gas bearing assembly (18) that is temperature-controlled with dispensing gas (43, 44), and comprising a gas temperature-control device (35), wherein the gas temperature-control device (35) is combined with a liquid temperature-control device (40) in an annular space (33) of the gas supply apparatus (21), wherein the gas temperature-control device (35) has a gas guiding geometry (36) comprising gas guiding bodies (37), such as ribs, lamellae, or fins, and wherein the gas guiding geometry (36) further comprises an axial web (39) fluidically separating a gas supply side (46) of the gas guiding geometry (36) from a gas discharge side (47) of the gas guiding geometry (36).

2. The gas supply apparatus according to claim 1, wherein the gas temperature-control device (35) comprises a round-bent sheet metal component (38;54;56;58) with the gas guiding geometry (36).

3. The gas supply apparatus according to claim 2, wherein the gas temperature-control device (35) comprises a sleeve-like base body (45).

4. The gas supply apparatus according to claim 3, wherein the round-bent sheet metal component (38;54;56;58) is connected to the sleeve-like base body (45) in a material-locking manner.

5. The gas supply apparatus according to claim 3, wherein the liquid temperature-control device (40) is arranged on an inner diameter (41) of the base body (45).

6. The gas supply apparatus according to claim 3, wherein the liquid temperature-control device (50) is arranged on an outer diameter (42) of the gas temperature-control device (35).

7. The gas supply apparatus according to claim 1, wherein the gas guiding geometry (36) comprises flow channels (48) in which the dispensing gas (43, 44) is deflected between the gas supply side (46) and the gas discharge side (47).

8. The gas supply apparatus according to claim 1, wherein the gas temperature-control device (35) is combined with the liquid temperature-control device (40) in the annular space (33) within the housing of the gas supply apparatus (21).

9. A gas supply apparatus (21) having a shaft (23) rotatably mounted in a housing (22) using a gas bearing assembly (18) that is temperature-controlled with dispensing gas (43, 44), and comprising a gas temperature-control device (35), wherein the gas temperature-control device (35) is combined with a liquid temperature-control device (40) in an annular space (33) of the gas supply apparatus (21), wherein the gas temperature-control device (35) comprises a sleeve-like base body (45), and wherein the liquid temperature-control device (40) is arranged on an inner diameter (41) of the base body (45).

\* \* \* \* \*